United States Patent [19]

Marchionni et al.

[11] Patent Number: 5,051,158

[45] Date of Patent: Sep. 24, 1991

[54] PROCESS FOR PREPARING CONTROLLED MOLECULAR WEIGHT PERFLUOROPOLYETHERS HAVING PERFLUOROALKYL OR PERFLUOROCHLOROALKYL END GROUPS

[75] Inventors: Giuseppe Marchionni; Anna Staccione, both of Milan, Italy

[73] Assignee: Ausimont S.r.L., Italy

[21] Appl. No.: 346,479

[22] Filed: May 2, 1989

[30] Foreign Application Priority Data

May 2, 1988 [IT] Italy ............................... 20407 A/88

[51] Int. Cl.$^5$ .............................................. C07C 41/01
[52] U.S. Cl. ............................ 204/157.6; 204/157.63; 204/157.94; 204/158.11; 204/158.12
[58] Field of Search ............ 204/157.6, 157.63, 157.94, 204/158.11, 158.12

[56] References Cited

U.S. PATENT DOCUMENTS

| | | | |
|---|---|---|---|
| 3,442,942 | 5/1969 | Sianesi et al. | 204/157.89 |
| 3,665,041 | 5/1972 | Sianesi et al. | 568/601 |
| 3,683,027 | 8/1972 | Sianesi et al. | 568/416 |
| 3,704,214 | 11/1972 | Sianesi et al. | 204/157.6 |
| 4,647,413 | 3/1987 | Savu | 204/159.13 |
| 4,664,766 | 5/1987 | Marchionni et al. | 204/157.92 |
| 4,668,357 | 5/1987 | Marchionni et al. | 204/157.94 |
| 4,684,452 | 8/1987 | Marchionni et al. | 204/157.94 |
| 4,788,257 | 11/1988 | Caporiccio et al. | 525/403 |
| 4,859,299 | 8/1989 | Kobayashi et al. | 204/157.94 |
| 4,952,735 | 8/1990 | Kobayashi et al. | 568/560 |

FOREIGN PATENT DOCUMENTS

| | | |
|---|---|---|
| 151877 | 4/1986 | European Pat. Off. . |
| 193122 | 9/1986 | European Pat. Off. . |
| 223238 | 5/1987 | European Pat. Off. . |

*Primary Examiner*—T. Tung
*Assistant Examiner*—David G. Ryser
*Attorney, Agent, or Firm*—Morgan & Finnegan

[57] ABSTRACT

This invention relates to preparing perfluoropolyethers having neutral end groups by a process based on the photooxidation of $C_3F_6$ and/or $C_2F_4$, thereby obtaining controlled molecular weight products having perfluoroalkyl or perfluorochloroalkyl neutral end groups, with high yields of useful products.

5 Claims, No Drawings

PROCESS FOR PREPARING CONTROLLED MOLECULAR WEIGHT PERFLUOROPOLYETHERS HAVING PERFLUOROALKYL OR PERFLUOROCHLOROALKYL END GROUPS

FIELD OF THE INVENTION

The present invention relates to the preparation of neutral perfluoropolyethers having perfluoroalkyl end groups optionally containing one or two chlorine atoms.

BACKGROUND OF THE INVENTION

It is known to prepare perfluoropolyethers having perfluoroalkyl neutral end groups via photooxidation of fluoroolefins and subsequent fluorination with gaseous fluorine either in the presence or in the absence of ultraviolet radiations, thereby obtaining elimination of the peroxide groups and the conversion of the acid end groups to perfluoroalkyl groups. By this process, mixtures of products exhibiting different molecular weights and a very wide molecular weight distribution are generally obtained. The proportion of high molecular weight products is generally considerable. Processes of this type are described in U.S. Pat. Nos. 3,442,942, 3,665,041, 3,683,027, and in patent application EP 193,028.

For many applications of industrial interest it is necessary to have available products exhibiting a substantially lower molecular weight and a higher homogeneity. Thus, it was necessary to adopt methods for reducing the molecular weight, based on the thermal catalytic fractionation of the product in the presence of proper catalysts, according to patent applications EP 167,258 and EP 223,238.

This process is very important from an industrial viewpoint, because it permits one to fully utilize the photooxidation products, which generally have a high average molecular weight and may not be usefully utilized directly as such.

On the other hand, the separation of products having a relatively low average molecular weight—as is desired—from the photosynthesis rough mixture is very complicated and difficult to be carried out on an industrial scale. Furthermore, the yield of useful products exhibiting a low molecular weight is quite low (about 10%-20%).

Thus, the necessity was felt to have available an alternative industrial process capable of providing a very high yield of products, having molecular weights in the desired range, directly in the photooxidation process, without requiring any subsequent operative step for the molecular weight regulation.

DETAILED DESCRIPTION OF THE INVENTION

Thus, in accordance with the present invention this technique relates to a process for preparing perfluoropolyethers of the formula:

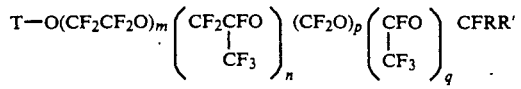

wherein;

T is a perfluoroalkyl group, which may contain a chlorine atom, and in particular it may be $CF_2Y-$, $CF_2YCF_2-$, $YCF_2CF(CF_3)-$, or $YCF(CF_3)CF_2-$, where Y is fluorine or chlorine; or in other words, a perfluoroalkyl group wherein one of the halogen atoms may be chlorine, the remaining halogen atoms being fluorine;

R and R', alike or different from each other, are fluorine or chlorine; and the indexes m, n, are numbers ranging from 0 to 20, extremes included, p ranges from 0 to 40, extremes included, and q ranges from 0 to 10, extremes included, with the following provisos:

1. when m=0, n ranges from 1 to 20, and $$\frac{p+q}{n}$$

ranges from 0.01 to 0.5 (extremes included),
2. when n=0, also q is=0, m ranges from 1 to 20, and p/m ranges from 0.5 to 2 (extremes included) and
3. when n and m are other than 0, m+n ranges from 1 to 20, and (p+q)/(m+n) ranges from 0.01 to 0.5 (extremes included).

The invention also includes novel products of the process.

The process for preparing the above products comprises the following essential operative steps:

(a) Photooxidizing perfluoropropene and/or tetrafluoroethylene in a liquid reaction phase initially consisting or consisting essentially of $C_3F_6$ and/or, optionally, a chlorofluorocarbon solvent, and in the presence of a fully halogenated ethylene containing 1 to 4, preferably 1 or 2 atoms of Cl or Br or I, by means of gaseous $O_2$, by irradiating with ultraviolet rays (wave-length from 2,000 to 6,000 Å) the liquid reaction mixture maintained at a temperature from $-20°$ to $-100°$ C., and preferably from $-50°$ to $-60°$ C. The fully halogenated ethylene is introduced into the reaction mixture simultaneously with the $O_2$ flow, in an amount which may be up to or equal to 50% by moles with respect to the perfluoroolefins ($C_3F_6$ and/or $C_2F_4$) but generally not exceeding 20%. As the fully halogenated ethylenes there may be used in particular $CF_2=CFCl$, $CFCl=CFCl$, $CF_2=CCl_2$, and $CF_2=CFBr$.

(b) Fluorinating the rough product obtained in (a) by means of gaseous fluorine, said fluorination being conducted at a temperature ranging from 100° to 250° C. or from 0° to 120° C., in the presence of ultraviolet radiations.

This process is carried out according to a per se known operative technique (see U.S. Pat. Nos. 3,665,041, and 4,664,766). In the course of the fluorination treatment, besides the conversion of the acid end groups to neutral perfluoroalkyl groups, the substitution of all the bromine and iodine, if they are present in the photooxidation product, also takes place. As regards chlorine, the substitution is only very limited. Furthermore, decomposition of the peroxide groups contained in the photooxidation rough product takes place, too.

By the process of the present invention it is to obtain high yields of fully fluorinated products or of products containing chlorine only in the end groups. The latter products have proved to be endowed with high thermal and chemical stabilities and to be fully comparable, as regards practical uses, to known perfluoropolyethers with perfluoroalkyl end groups. Thus, they are utilized in the field of testing for electronics, such as the gross leak test, the burn test, and the thermal shock test (see European patent 203,348).

Another field of application is that of the formulation of lubricating greases (see U.S. Pat. No. 4,472,290).

EXAMPLES

The following examples are given merely to illustrate the present invention and are not to be construed as a limitation thereon.

EXAMPLE 1

A. Photooxidation

Into a cylindrical glass reactor (volume=1,000 ml; optical path=2 ml) equipped with an inner coaxial quartz sheath and also equipped with a dipping pipe for introducing the gases, with a sheath with a thermocouple for taking the inside temperature, and with a reflux cooler maintained at a temperature of $-80°$ C., there were introduced 1,600 g of $C_3F_6$ at a temperature of $-60°$ C. Through the dipping pipe, a gaseous mixture consisting of 27 l/h of O$hd$ 2 and 3 l/h of $C_2F_3Cl$ was bubbled into the reactor. By means of a refrigerating bath placed outside the reactor, the temperature of the reacting liquid phase was maintained at $-60°$ C. during the entire run.

After having introduced into the quartz sheath an ultraviolet ray lamp type HANAU TQ 150 (which emitted 47 watts of ultraviolet radiation having a wavelength from 2,000 to 3,000 Å), the lamp was switched on, and irradiation and feeding of the reacting gases were continued for 5 hours.

After a five-hour irradiation the lamp was switched off, degassing was carried out, and the unreacted $C_2F_6$ was recovered from the reactor by evaporation at room temperature.

An oily polymeric residue was thus obtained. The product yield was equal to 1,041 g.

The residue was subjected to iodometric analysis to calculate the active (peroxide) oxygen content, which turned out to be equal to 0.32% by weight, as well as to NMR $^{19}F$ analysis, which revealed that the residue consisted of polyether chains of the type:

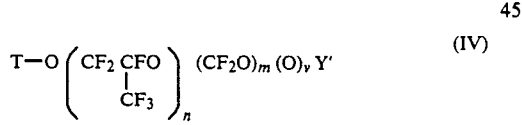  (IV)

where:

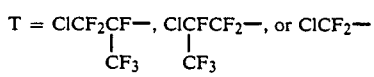

with a marked predominance of the first two end group types;

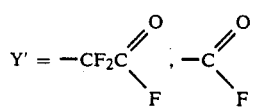

the second being present in an amount <5% of the end groups Y'; and the m/n ratio being very low (<0.05).

The product viscosity, determined at 20° C. by means of an Ostwald-Fenske viscosimeter, was equal to 5.7.

The infrared analysis exhibited the bands which are typical of groups:

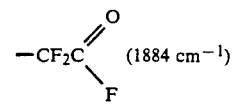

The mass spectrometric analysis confirmed both the presence of the end groups determined by NMR analysis, and the absence of —CFCl CF$_2$O— units in the chain. On NMR analysis, the product exhibited an m/n ratio equal to 0.01 and a molecular weight of 960.

The chlorine analysis indicated a chlorine content of 4.2% by weight.

Assuming that the product contains only one chlorine atom per chain, as is represented in the above formula, an average molecular weight equal to 840 is calculated.

The product was hydrolyzed by means of a water-saturated nitrogen flow. After hydrolysis, the product exhibited a viscosity of 31 cSt at 20° C.

The hydrolyzed product was then distilled under vacuum (from 20 to 1 mm of Hg) at a maximum temperature in the boiler of 210° C.

Three fractions were obtained.

TABLE 1

|  | g | M.W. | Viscosity |
|---|---|---|---|
| Fraction I | 130.6 | 400 | 4.8 |
| Fraction II | 238.2 | 600 | 7.9 |
| Fraction III | 552.3 | 1300 | 112 |

NMR $^{19}F$ analysis carried out on the three samples confirmed the structure:

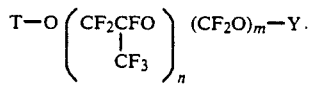

where

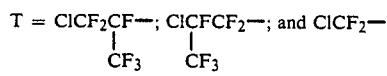

with a marked prevalence of the first two types; and Y=—CF$_2$COOH, and permitted one to calculate the molecular weight (M.W.): the values obtained are indicated above in Table 1.

B. Fluorination

A photochemical reactor (volume=100 ml) equipped with a quartz sheath for housing a mercury-vapor lamp type HANAU TQ 150, and also equipped with a bubbler, a magnetic stirrer, a CO$_2$ trap, and a thermoregulation system for both the reactor and the sheath system, utilizing FC 70 ® and GALDEN DOZ ®, was charged with 210.2 g of acid perfluoropolyether having a viscosity of 112.4 cSt, obtained as described above (Fraction III). After the lamp was switched on, fluorination was carried out with a fluorine flow equal to 3 l/h, the apparatus having been thermoregulated at 90° C.

After 6 hours, the product was completely neutral.

NMR $^{19}F$ analysis conducted on a sample confirmed the structure:

$$T\text{—O } CF_2CFO\ (CF_2O)\text{—}CF_3$$
$$|$$
$$CF_3$$

with $T = YCF_2CF-$; $YCFCF_2-$; $YCF_2-$;
         $\quad\quad\quad |\quad\quad\quad\ |$
         $\quad\quad\ CF_3\quad\ CF_3$ where Y is F or Cl and the ratio of end groups with Y=Cl/fully perfluorinated end groups being 0.96.

By carrying on the fluorination for a further 20 hours, this ratio was brought down to 0.53 and the resulting product (189 g) exhibited a viscosity of 19 cSt.

The photochemical fluorination conducted on the Fraction II sample obtained in Example 1, under the same conditions described above, but at a temperature of 10° C., provided, after 10 hours, a completely neutral product having a viscosity at 20° C. equal to 1.5 cSt, the yield being 86%.

Example 2

A. Photooxidation of $C_2F_4 + CFCl=CF_2$

Into a cylindrical glass reactor (diameter=80 mm, volume=about 600 cc) equipped with an inner coaxial quartz sheath of 20 mm of diameter, and furthermore equipped with a dipping tube for introducing the gases, and a reflux cooler maintained at a temperature of $-80°$ C., there were introduced 600 cc of A-12 ($CF_2Cl_2$). Through the dipping tube, a gaseous mixture consisting of oxygen, $C_2F_4$, and $ClC_2F_3$ was bubbled into the reactor.

By means of a refrigerating bath placed outside the reactor, the reacting liquid phase was maintained at the operating temperature indicated below in Table 2 for the whole duration of the test.

After having introduced into the quartz sheath an ultraviolet ray lamp type HANAU TQ 150 (which emitted 47 watts of ultraviolet radiation having a wavelength ranging from 2,000 to 3,000 521 ), the lamp was switched on, and irradiation and feeding of the reagents was carried on for a period of 5 hours.

The gases leaving the reactor were eliminated after undergoing an alkaline washing. After a five-hour irradiation, the lamp was switched off and the solvent was removed from the reactor by evaporation at room temperature.

An oily polymeric residue was obtained. This residue was subjected to iodometric analysis in order to determine the active oxygen content, and to NMR $^{19}F$ analysis, which revealed that the residue was composed of polyether chains of the type:

$$T'\text{—O } (CF_2CF_2O)_n\ (CF_2O)_m\ (O)_v\ Y' \quad\quad (V)$$

with
$T'=ClCF_2CF_2-$; $ClCF_2-$
$Y'=-CF_2COF$; $-COF$.

The m/n ratio depends on the synthesis conditions (temperature) and ranged from 0.5 to 2.

The product viscosity was determined at 20° C. by means of an Ostwald-Fenske viscosimeter.

Reaction conditions and characteristics of the oil produced are reported below in Table 2.

B. Fluorination

Utilizing a photochemical reactor like that described in Example 1 B and following the same procedures, but employing a temperature of 60° C., a fluorination was effected on the product obtained according to the procedures described in Example 2 A (Test No. 4, Table 2), after having subjected the peroxide group to hydrolysis and thermal treatment (Yield =78%).

After a 12-hour fluorination, the recovered product (Yield=93%) exhibited a viscosity of 7 cSt at 20° C., and the NMR $^{19}F$ analysis revealed that the polyether consisted of the structure:

$$T\text{—O } (CF_2CF_2O)\ (CF_2O)\text{—}CF_3$$

with
$T=YCF_2CF_2-$; $YCF_2-$
with Y=Cl or F.

TABLE 2

| Test No. | T (°C.) | $O_2/C_2F_4$ | $C_2F_4$/CTFE | Time (h) | Amount (g) | Viscosity | P.O. | M.W. | $\dfrac{Y'}{T'}$ (1) |
|---|---|---|---|---|---|---|---|---|---|
| 1 | −40 | 2.37 | 9.3 | 5 | 141 | 11 | 2.8 | 1.470 | 1.13 |
| 2 | −40 | 2.35 | 11.0 | 5 | 145 | 15.1 | 2.6 | 1.610 | 1.15 |
| 3 | −40 | 2.46 | 5.0 | 5 | 130 | 5.1 | 3.0 | 960 | 1.18 |
| 4 | −60 | 3.5 | 19 | 5 | 163 | 40 | 2.5 | 2.700 | 1.2 |

Note:
The ratio values <1 indicate that some neutral and groups T' are replaced by acid end groups Y'; the contrary is indicated when the value of the ratio is >1.

EXAMPLE 3

A. Photooxidation of $C_3F_6$ with $CFBr=CF_2$

In a photochemical reactor like that described in Example 1 charged with 800 g of $C_3F_6$, a photosynthesis was carried out at a temperature of −64° C., wherein, through a dipping pipe, oxygen and $BrC_2F_3$ in a ratio of 2.4/1 and with a total flow of 32 l/h were separately bubbled, after dilution with helium.

After a 5-hour irradiation, the lamp was switched off and unreacted $C_2F_6$ was recovered. 43.1 g of an oily product were obtained.

Iodometric analysis of this product indicated an active oxygen content of 0.43% by weight.

The product exhibited a viscosity of 6.95 cSt and the NMR $^{19}F$ analysis indicated that the polyether consisted of perfluoropolyether structures of type:

$$T\text{—O}\left(\begin{array}{c}CF_2CFO\\ |\\ CF_3\end{array}\right)_n (CF_2O)_m\ (O)_v\text{—}Y$$

where $T = BrCF_2CF-$; $BrCFCF_2-$; $CF_3$
     $\quad\quad\quad |\quad\quad\quad\ |$
     $\quad\quad\ CF_3\quad\ CF_3$ with a marked predominance of the first two types;

$Y = -CF_2COF, -COF$ with a marked predominance of the first type, with a molecular weight equal to 800 and an m/n ratio equal to 0.005.

The T/Y ratio was equal to 1.

Bromine analysis indicated a value of 8.9%.

Assuming that the product contains only one bromine atom per molecule, a molecular weight of 898 is calculated.

B. Fluorination

In the same apparatus utilized in Example 1 B, a fluorination was conducted, at a temperature of 5° C., on a mixture of 20 g of the product obtained in Example 3 A and 70 g of FC 70 [N(C$_5$F$_{11}$)$_3$] (perfluorotripentylamine) utilized as a solvent.

After a 19-hour introduction of a fluorine flow (1 l/h) there were discharged from the reactor 85.2 g of a mixture, from which, by distillation, 15 g of perfluoropolyether were separated.

On NMR $^{19}$F analysis, such perfluoropolyether was shown to be composed of a structure of the type:

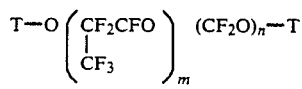

no longer containing peroxide groups, with:

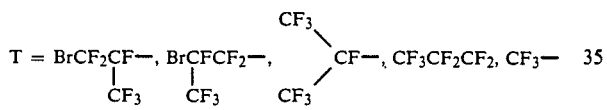

where, however, the ratio between perfluorinated neutral end groups and bromine-containing neutral end groups was equal to 3.

The resulting product was subjected once again to a fluorination using the same reactor, but conducting the test at 50° C. with a fluorine flow of 3 l/h. After a 40-hour reaction, there were discharged 88 g of a mixture from which 11 g of perfluoropolyether were separated.

On NMR $^{19}$F analysis, such perfluoropolyether was shown to consist of the structure of the type:

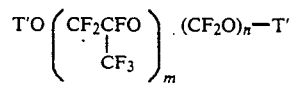

with $T' = -CF(CF_3)_2, -CF_2CF_2CF_3, -CF_3$ and a molecular weight equal to 650.

In this run, a trap cooled to $-80°$ C. was placed at the reactor outlet in order to collected the by-products developed from the reaction which exhibited a yellow color due to the presence of BrF and complexes thereof.

What is claimed is:

1. A process for preparing perfluoropolyethers having perfluoroalkyl or perfluorochloroalkyl end groups, of the formula:

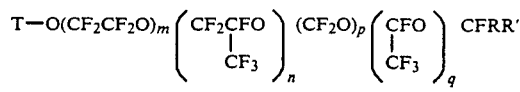

where:

T is a perfluoroalkyl group which may optionally contain a chlorine atom, such as $CF_2Y-$, $CF_2YCF_2-$, $YCF_2CF(CF_3)-$, or $YCF(CF_3)CF_2-$, where Y is fluorine or chlorine;

R and R', alike or different from each other, are fluorine or chlorine; and the indexes m, n, are numbers ranging from 0 to 20, extremes included, p ranges from 0 to 40, extremes included, and q ranges from 0 to 10, extremes included, with the following provisos:

1. when m=0, n ranges from 1 to 20, and $$\frac{p+q}{n}$$

ranges from 0.01 to 0.05, 2. when n=0,, also q is =0, m ranges from 1 to 20, and p/m ranges from 0.5 to 2, extremes included, and 3. when n and m are other than 0, m+n ranges from 1 to 20, and (p+q)/(m+n) ranges from 0.01 to 0.05, extremes included;

the process comprising the follwoing steps:

(a) photooxidizing perfluoropropene or tetrafluoroethylene or a mixture thereof in a liquid reaction mixture initially consisting essentially of C$_2$F$_6$, and optionally of chlorofluorocarbon, as a reaction solvent, and of a fully halogenated ethylene with gaseous O$_2$, by irradiating with ultraviolet rays the reaction mixture maintained at a temperature of from $-20°$ C. to 100° C., said fully halogenated ethylene containing 1 to 4 atoms of Cl or Br or I, said fully halogenated ethylene being fed to the reaction mixture in an amount up to 50% by moles with respect to fluoroolefin; and (b) a fluorination treatment using gaseous fluorine, effected with ultraviolet radiation at a temperature from 100° C. to 250° C. or from 0° to 120° C.

2. The process according to claim 1, wherein the fully halogenated ethylene contains 1 or 2 atoms of Cl or Br or I.

3. The process according to claim 1, wherein the fully halogenated ethylene is being fed in an amount not exceeding 20% by moles.

4. The process according to claim 1, wherein the liquid reaction mixture is maintained at a temperature from $-50°$ C. to $-60°$ C.

5. The process according to claim 1, wherein the fully halogenated ethylene is selected from CF$_2$=CFCl, CFCl=CFCl, CF$_2$=CCl$_2$ or CF$_2$=CFBr.

* * * * *